(12) United States Patent
Itoh et al.

(10) Patent No.: US 7,187,151 B2
(45) Date of Patent: Mar. 6, 2007

(54) CONVEYOR UNIT, CONTROLLER FOR A DRIVING ROLLER FOR USE IN THE CONVEYOR UNIT, AND ZONE CONTROLLED CONVEYOR SYSTEM INCORPORATING THE CONVEYOR UNIT

(75) Inventors: Kazuo Itoh, Kasai (JP); Yoshio Inoue, Hyogo (JP)

(73) Assignee: Itoh Denki Co., Ltd., Hyogo (JP)

( * ) Notice: Subject to any disclaimer, the term of this patent is extended or adjusted under 35 U.S.C. 154(b) by 0 days.

(21) Appl. No.: 11/294,024

(22) Filed: Dec. 5, 2005

(65) Prior Publication Data
US 2006/0132077 A1 Jun. 22, 2006

(30) Foreign Application Priority Data
Dec. 16, 2004 (JP) ............................. 2004-364066

(51) Int. Cl.
G05B 5/00 (2006.01)
(52) U.S. Cl. .................. 318/474; 318/478; 318/476; 318/501; 318/516
(58) Field of Classification Search ................ 318/474, 318/478, 476, 496, 494, 501, 515, 516, 514
See application file for complete search history.

(56) References Cited

U.S. PATENT DOCUMENTS 3,742,477 A * 6/1973 Enabnit ................. 198/810.02
6,047,812 A 4/2000 Horn et al.
6,146,813 A * 11/2000 Girard et al. ............... 430/319
2003/0209410 A1 11/2003 Itoh et al.

FOREIGN PATENT DOCUMENTS

JP 2000335730 5/2000

* cited by examiner

Primary Examiner—Karen Masih
(74) Attorney, Agent, or Firm—Wood, Phillips, Katz, Clark & Mortimer

(57) ABSTRACT

A conveyor unit (2) including a driving roller (5), a motor (30) for powering the driving roller (5), and a controller (10) adapted to adjust the motor (30) so as to control the driving roller (5), the motor (30) including a permanent magnet and an armature having a plurality of armature coils (32a–32c), and the controller (10) having an interrupter (15) adapted to repeat shunting and deshunting of at least one of the coils (32a–32c) and a rotation detector (17) adapted to detect an externally forced rotation of the motor (30) in response to an electromotive force induced in at least one of the coils (32a–32c), wherein in the case that the motor (30) is not driven, the controller (10) maintains operations of the interrupter (15) and outputs a presence signal by determining conveyance of an article (W) into an area powered by the motor (30) upon detection of the rotation of the motor (30) by means of the rotation detector (17).

25 Claims, 13 Drawing Sheets

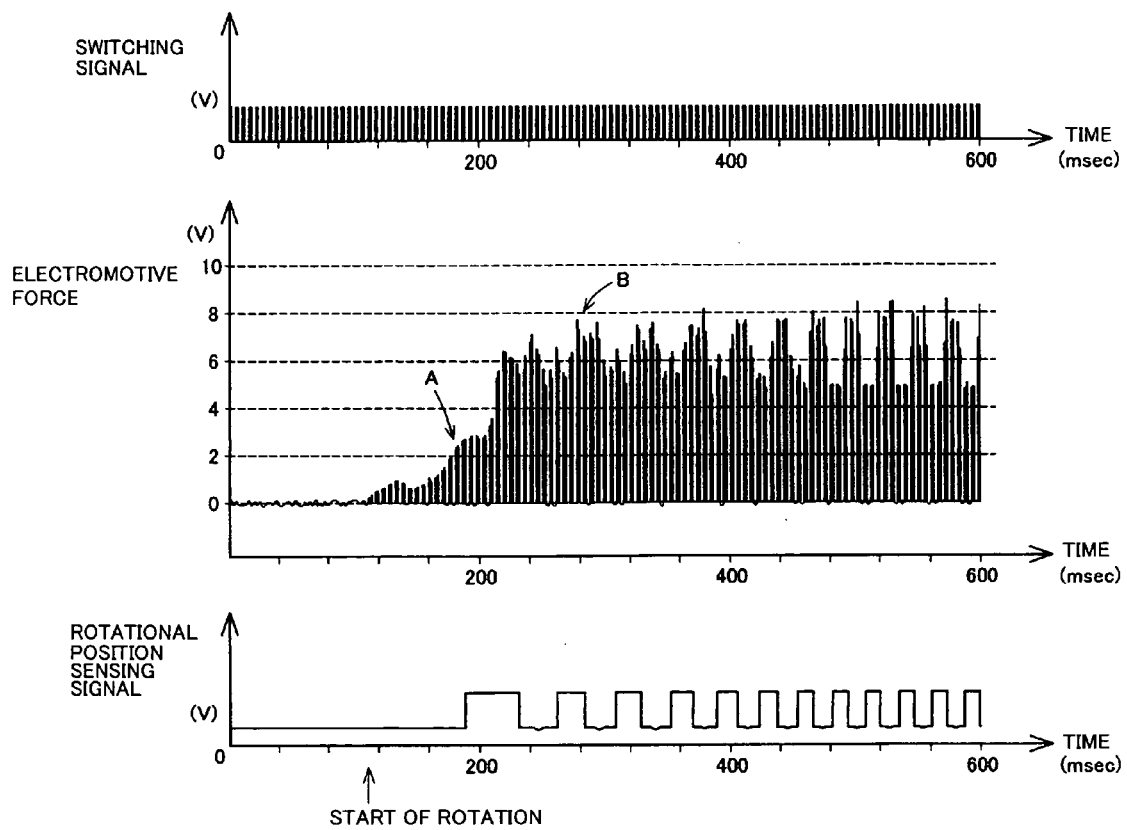
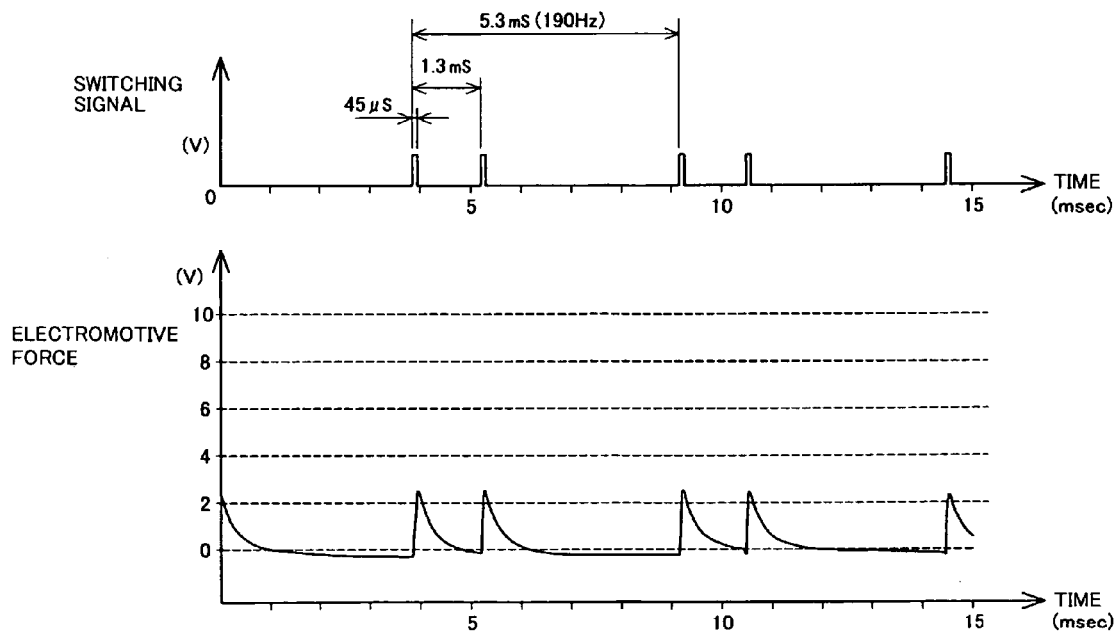

|←— D —→|←— C —→|←— B —→|←— A —→|

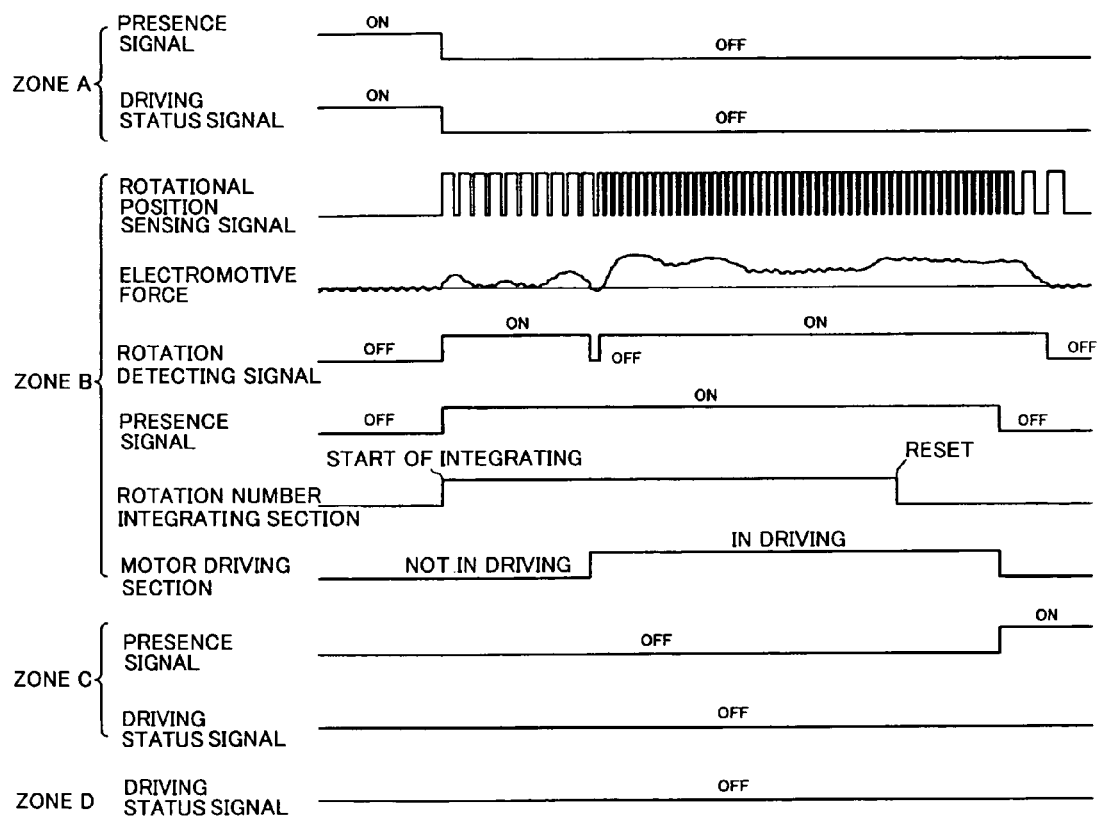

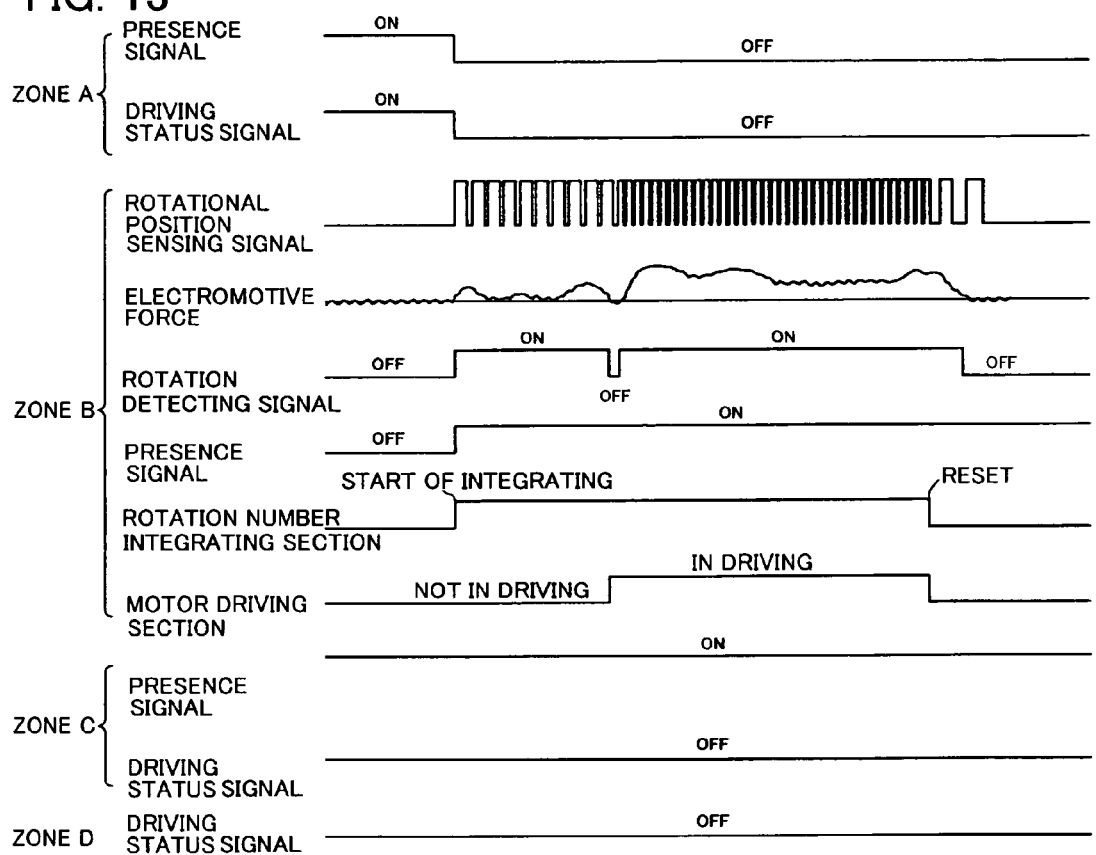

|← D →|← C →|← B →|← A →|

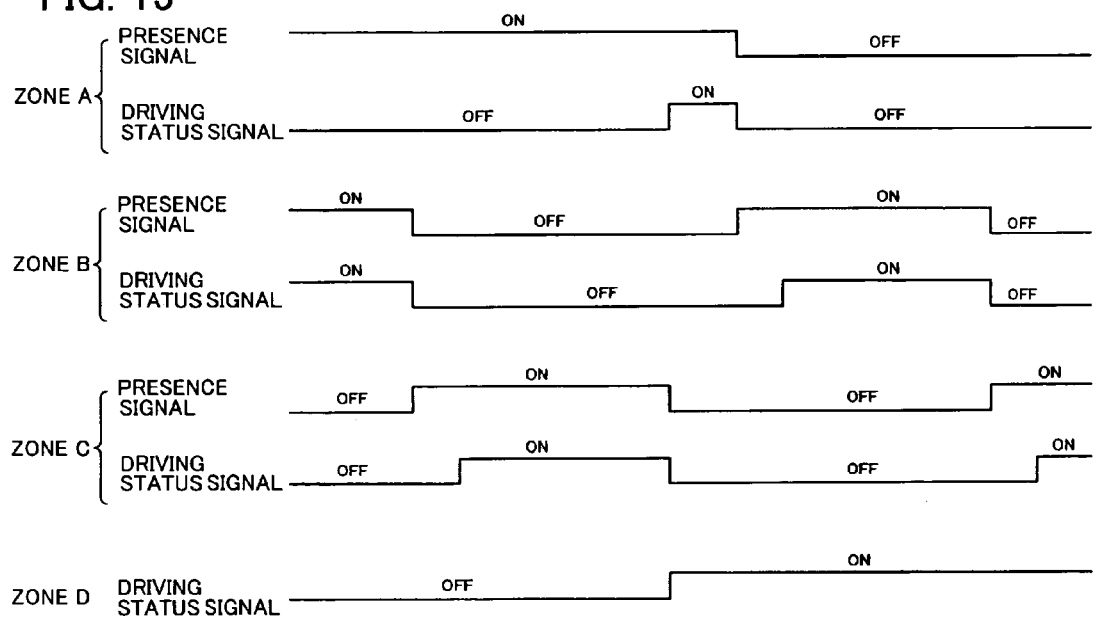

CONVEYOR UNIT, CONTROLLER FOR A DRIVING ROLLER FOR USE IN THE CONVEYOR UNIT, AND ZONE CONTROLLED CONVEYOR SYSTEM INCORPORATING THE CONVEYOR UNIT

BACKGROUND OF THE INVENTION

1. Field of the Invention

The present invention relates to a conveyor unit, and more specifically to a conveyor unit capable of controlling conveyance without using a sensor for detecting articles. The present invention also relates to a zone controlled conveyor system incorporating the conveyor unit.

2. Description of the Related Art

A zone controlled conveyor system for controlling conveyance having a conveyor line consisting of a plurality of control zones (zones for control), each zone having a conveyor unit for controlling conveyance of articles has been developed.

A patent document 1 specified below discloses such a conveyor system.

The conventional conveyor system that is disclosed in the patent document 1 includes a conveyor unit provided with a zone controller for controlling a driving roller in each control zone. The controllers of adjacent control zones, mutually connected, drive and halt operations of the driving roller depending on presence signals of each article of its home control zone (i.e., the zone corresponding to the zone controller in question), taking into account signals such as presence signals transmitted from upstream and downstream control zones. More specifically, according to the conventional conveyor system disclosed in the patent document 1, such cooperative control by zone controllers achieves the "zero-pressure accumulating control" that enables articles to be conveyed toward a conveying direction, avoiding collision therebetween.

The conventional system requires a sensor for detecting an article provided at each control zone, resulting in being obliged to attach components such as the sensor or a cable for connecting the sensor to the controller at each conveyor unit. That increases the number of components, causing increased cost and troublesome construction of the system.

In order to solve the problem described above, a conveyor unit that conveys articles dispensing with a sensor has been developed. Patent documents 2 and 3 specified below disclose such a conveyor unit that eliminates a sensor.

The conveyor unit disclosed in the patent document 2 generates pulses depending on rotational speed of a motor or a driving roller and compares the generated pulses with predetermined reference pulses, thereby detecting whether an article is conveyed into the home control zone or out of the zone.

The conveyor unit disclosed in the patent document 3 makes a normal rotation and a reverse rotation of a motor during conveyance of an article and detects a difference of rotational speed of the motor at this time by a difference of the number of pulses generated from the motor, thereby determining conveyance of the article into the home control zone or out of the zone.

These conventional units disclosed in the patent documents 2 and 3 dispense with a sensor to detect whether an article is conveyed into the home control zone or out of the zone, thereby enabling reduction of cost and the trouble of construction of the system.

Patent Document 1: JP 11-199030 A
Patent Document 2: JP 2000-335730 A
Patent Document 3: US 2003-0209410 A1

However, the conveyor unit disclosed in the patent document 2 employs a magnetic-pole detector such as a Hall element detecting a rotational position of a rotor to generate pulses depending on a rotation of a motor or a driving roller. A status of conveyance of an article cannot be determined until the magnetic-pole detecting element detects a magnetic pole reversal, until the motor or the driving roller reaches a reference rotation number, or until a reference time has passed, causing a failure that the status of conveyance cannot be determined precisely and in a short period of time.

The conveyor unit disclosed in the patent document 3 cannot determine a status of conveyance of an article unless the motor is normally and reversely rotated, requiring time to determine the status. Thus, some improvement has been desired.

Therefore, the inventors of the present invention experimentally created a conveyor unit adapted to detect an article conveyed thereon by use of an electromotive force generated by an externally forced rotation of a motor.

FIG. 16 is a block diagram showing an operating principle of the conveyor unit 100 experimentally created by the inventors. The conveyor unit 100 includes a drive control section 101, a motor driving section 102, and a motor 103.

When an article is conveyed on the conveyor unit 100, the drive control section 101 generates a driving signal in response to a rotational position sensing signal outputted from Hall elements 104 depending on a rotational position of a rotor (not shown), whereupon the motor driving section 102 sequentially applies current to each of armature coils 103a to 103c to drive rotation of the motor 103 in response to the driving signal generated by the drive control section 101.

When the motor 103 is not driven, an external rotational force that is caused by conveyance of the article and acts on the motor 103 induces an electromotive force in the armature coils 103a to 103c. As shown in FIG. 16, the electromotive force induced in the armature coils 103a and 103b is derived as a detection signal, thereby determining an externally forced rotation of the motor 103; that is, whether the article is conveyed into an area powered by the motor 103 or onto the conveyor unit 100.

Although it is possible, in principle, that the conveyor unit 100 shown in FIG. 16 detects conveyance of the article onto the conveyor unit, it was in a critical problem in actually designing the device.

FIG. 17 is a graph showing the rotational position sensing signal and the electromotive force in the conveyor unit 100 shown in FIG. 16 with their time axes aligned, the sensing signal being outputted from the Hall elements 104 in an externally forced rotation of the rotor (not shown) of the motor 103, the electromotive force being generated by the armatures.

Referring to FIG. 17, at the time of non-drive of the motor 103, an externally forced rotation of the motor 103 induces an electromotive force with an increased peak value (crest value) in the armature coils 103a and 103c in proportion as shortening of pulse width of the rotational position sensing signal (i.e., as increasing of the speed of the rotation).

However, in a place where the conveyor unit 100 is installed, fluctuations of magnetic field generated by adjacent conveyor units 100 and ground potential are liable to occur, causing the armature coils 103a to 103c to suffer from many noise components.

Thus, during slow speed of the externally forced rotation of the motor 103, the electromotive force induced in the armature coils 103a and 103c may be undetectable being lost among the noise components. That results in such a problem that threshold value in the electromotive force level for determining the rotation of the motor 103 must be set high to avoid a false detection because of the noise.

More specifically, the conveyor unit 100 shown in FIG. 16 has an excellent structure utilizing the electromotive force of the motor 103, nevertheless it may cause contradictory problems such that low setting of the threshold value of detection of the electromotive force leads to a false detection because of the noise, whereas high setting of the threshold value requires substantial time to detect the rotation of the motor 103, and thus it was difficult to design and to be practicable.

Taking into account the above-mentioned problems, the present invention proposed herein is to provide a conveyor unit adapted to take advantage of a function of power generation of a motor to stably detect conveyance of articles thereon, and further adapted to be readily designed. The present invention proposed herein is also to provide a zone controlled conveyor system incorporating the conveyor unit.

SUMMARY OF THE INVENTION

An aspect of the present invention proposed for achieving the aim described above is a conveyor unit including a driving roller, a motor for powering the driving roller, and a controller adapted to adjust the motor so as to control the driving roller, the motor including a permanent magnet and an armature having a plurality of armature coils, and the controller having an interrupter adapted to repeat shunting and deshunting of at least one of the coils.

Herein, "to shunt a coil" means to electrically connect the both ends of the coil by a line, and "to deshunt a coil" means to interrupt the line.

In this invention, preferably a conveyor unit includes one driving roller because of simplicity of structure, though the unit may include a plurality of driving rollers.

The controller relating to the present aspect is a controller for controlling a driving roller for use in a conveyor unit having a motor for powering the driving roller, the motor including a permanent magnet and an armature having a plurality of armature coils, wherein the controller has an interrupter being adapted to repeat shunting and deshunting of at least one of the coils.

The controller in the present aspect detects an externally forced rotation of the motor in response to an electromotive force induced in at least one of the coils.

The shunting is preferably performed in a condition that the armature is not energized.

The shunting can be performed in a condition that the armature is halted.

A principle of the present invention will be detailed in the following description.

Upon an externally forced rotation of a rotor of the motor including a permanent magnet, an electromotive force is induced in the coil. However, level of the induced electromotive force is low with the both ends of the coil deshunted. Especially, when the rotational speed of the motor is low, the level is so low that the electromotive force is undetectable among the noise induced in a circuit encircling the coil.

However, once the ends of the coil are shunted, and then deshunted after energization of the coil by applying the generated electromotive force to the coil itself, the coil generates a large back electromotive force in accordance with shutting off of an applied current by deshunting even with very small amount of current generated by the electromotive force. The present invention uses this principle to readily detect generation of an externally forced rotation of the motor.

According to the present invention, when an electromotive force is induced in the coil in accordance with the rotation of the rotor of the motor during repeating the shunting and deshunting of the ends of the coil by means of the interrupter, current is made to flow through the coil itself by the induced electromotive force in shunting of the coil, in the aftermath of which the coil generates a large back electromotive force in accordance with shutting off of the current in deshunting the coil.

Especially, even in the above-mentioned condition in which the rotational speed of the motor is low and the current applied to the coil by the electromotive force is very small, shutting off of the applied current makes the coil to generate a large back electromotive force. Consequently, even with the low rotational speed of the motor, a generated level of back electromotive force is larger than a noise level, ensuring a sufficient noise margin.

This enables to detect generation of an externally forced rotation of the motor precisely in a short period of time with avoiding a false operation resulting from noise by setting a suitable threshold value at the rotation detector.

In the present invention, the shunting can be performed by directly shunting the ends of the coil by the interrupter or via a resistor having a suitable resistance. Further, the shunting can be performed by the interrupter for a duration and with a cycle both suitably set.

However, the lower the resistance component in shunting is, or the longer the duration and the shorter the cycle is, the larger the braking force by electric power generation acted on the rotor, resulting in difficulty in detecting the rotation because of suppression of an very small externally forced rotation of the rotor.

Thus, setting a resistance as high as possible, the duration as short as possible, the cycle as long as possible in shunting by the interrupter to the extent possible to ensure a sufficient noise margin of a back electromotive force level with the low rotational speed of the motor makes possible to increase detection sensitivity of the rotation by reducing the braking force by electric power generation in accordance with the shunting.

Therefore, the shunting is preferably performed repeatedly, each shunting for a duration of 100 μS or less.

Further, the shunting is preferably performed periodically with a cycle of 1.0 mS or more.

The shunting is preferably performed repeatedly with the total time of shunting less than 5 per cent of the overall time.

Herein, "the total time of shunting" means the total of time durations in which shunting is performed, whereas "the overall time" means the overall or entire time duration in which shunting or deshunting is performed.

It is preferable that the shunting is performed by repeating pulse trains of shunting with a predetermined cycle, each of the pulse trains including a plurality of pulses of shunting generated at predetermined intervals.

The controller preferably has a rotation detector adapted to detect an externally forced rotation of the motor in response to an electromotive force induced in at least one of the coils.

In the case that the motor is not driven, the controller maintains operations of the interrupter and outputs a presence signal by determining conveyance of an article into an area powered by the motor upon detection of the rotation of the motor by means of the rotation detector.

In the case that the conveyor unit includes one driving roller, the area corresponds to the conveyor unit.

The present aspect detects the externally forced rotation of the motor during non-driving of the motor based on the above-mentioned principle, thereby outputting a presence signal by determining conveyance of an article onto the conveyor unit.

The interrupter can include a signal generating section adapted to generate switching signals and a switching device adapted to perform the shunting and deshunting in accordance with the switching signals.

According to the present aspect, the interrupter is constituted by a simple structure and has an increased durability compared to a structure using a mechanical switch since the switching device performs the shunting and deshunting, thereby achieving a cost saving and an increased durability.

When the motor employs a brushless motor, the switching device for controlling energization of the armature can be used also for shunting and deshunting the coil.

The present aspect has such a structure that the motor is a brushless motor having a rotor and a rotational position sensor adapted to determine a rotational position of the rotor, the controller further having a drive control section and a motor driving section, the drive control section being adapted to generate a driving signal in response to a sensing signal transmitted by the rotational position sensor, the motor driving section incorporating a plurality of switching devices and adapted to control energization of each of the coils by adjusting opening and closing of the switching devices in response to the driving signal, at least one of the switching devices in the motor driving section being adapted to function also as the switching device in the interrupter.

According to the present aspect, the switching device essential for the motor driving section is used also as the switching device of the interrupter, so that the interrupter dispenses with the own switching device, with the consequence that the number of components is reduced to save cost and that a manufacturing performance is improved.

The controller preferably receives external presence signals transmitted from outside, so as to stop outputting its presence signal upon receipt of an external presence signal during outputting its presence signal.

According to the present aspect, in the case of the conveyor unit having at least one other conveyor unit of the same structure arranged adjacent downstream, the controller stops outputting its presence signal by determining conveyance of an article onto said downstream conveyor unit upon receipt of a presence signal outputted by detection of conveyance of an article onto the downstream conveyor unit. That enables to control conveyance without a detector for detecting existence of an article, and also enables simplification and standardization of a structure of each conveyor unit.

Further, the controller can have a rotation detector adapted to detect an externally forced rotation of the motor in response to an electromotive force induced in at least one of the coils and a rotation number integrating section adapted to integrate the rotation number of the driving roller or of the motor powering the driving roller, so that the conveyor unit conveys an article to a predetermined position on the conveyor unit by driving the motor until the rotation number reaches a predetermined value, the number being integrated from the point of the first detection of the rotation of the motor by means of the rotation detector.

The present aspect enables to make sure to stop a conveyed article to a predetermined position on the conveyor unit, only if the integrated rotation number of the driving roller or the motor required for conveying an article from the upstream end of the conveyor unit to the predetermined position is obtained in advance. This enables to control conveyance without a sensor for detecting existence of an article.

Further, the present aspect enables to convey an article to a predetermined position regardless of the conveying speed unless the article is slipped on the conveyor unit.

For the same purpose, the controller can have a rotation detector and a timer, the rotation detector being adapted to detect an externally forced rotation of the motor in response to an electromotive force induced in at least one of the coils, so that the conveyor unit conveys an article to a predetermined position on the conveyor unit by driving the motor until the timer measures a predetermined time duration from the point of the first detection of the rotation of the motor by means of the rotation detector.

The present aspect enables to make sure to stop a conveyed article to a predetermined position on the conveyor unit, only if the time duration required for conveying an article from the upstream end of the conveyor unit to the predetermined position is obtained in advance. This enables to control conveyance without a sensor for detecting existence of an article.

Further, the controller can output a driving status signal indicating the motor in driving and a presence signal and receive a plurality of driving status signals and at least one presence signal transmitted from outside.

In the controller incorporated in the above-mentioned conveyor unit, since the rotation detector operates mainly while the motor stops, so that the rotation detector does not operate for detection in driving of the motor; that is, during outputting of a driving status signal. In other words, conveyance of an article into the conveyor unit is not detected while the motor is in driving. Thus, if another article were to be conveyed on the unit during conveyance of an article, conveyance would not be detected and stable conveyance would be disturbed.

In the present aspect, the controller of a conveyor unit refers to not only a driving status signal or a presence signal outputted from the conveyor unit itself but also driving status signals or presence signals outputted from the adjacent conveyor unit or from the conveyor unit further adjacent to the adjacent unit.

This stops an article from being conveyed by outputting a driving status signal or a presence signal to the adjacent conveyor unit while the motor in the conveyor unit is in driving and enables to control a stable conveyance avoiding such a failure that conveyance of an article onto the conveyor unit is undetectable.

The conveyor unit or the controller described above is suitable to be incorporated in a zone controlled conveyor system.

The zone controlled conveyor system embodying the present invention includes a plurality of zones for control arranged in a row in the direction of conveyance of articles, each of the zones having the conveyor unit.

The conveyor system in the present aspect stably controls conveyance although dispensing with a sensor for detecting existence of an article, thereby achieving cost saving and providing a zone controlled conveyor system having an easy system construction.

In the zone controlled conveyor system, it is preferable that each controller outputs at least one signal selected from a driving status signal and a presence signal to the controllers in a plurality of adjacent upstream zones, and simultaneously receives at least one signal selected from driving status signals and presence signals from controllers in a plurality of adjacent downstream zones.

The conveyor unit and the controller described above do not detect conveyance of an article onto the conveyor unit while the motor is in driving. Thus, it is necessary to stop an article from being conveyed from the adjacent upstream zone onto the home zone during conveyance of another article from the home zone to the adjacent downstream zone.

In the present aspect, a presence signal or a driving status signal is transmitted from the home zone to the adjacent upstream conveyor unit to stop an article from being conveyed onto the home zone while the motor in the home zone is in driving, thereby enabling to control conveyance having linkage among the conveyor units avoiding such a conveying status that conveyance of the article onto the conveyor unit is undetectable.

Another aspect of the present invention is a zone controlled conveyor system including a plurality of zones for control arranged in a row in the direction of conveyance of articles, each of the zones having a conveyor unit, the conveyor unit in each of the zones comprising a driving roller for conveying an article, a motor for powering the driving roller, and a controller adapted to adjust the motor so as to control the driving roller, the motor including a permanent magnet and an armature having a plurality of armature coils, the controller having an interrupter adapted to repeat shunting and deshunting of at least one of the coils, the controller further having a rotation detector adapted to detect an externally forced rotation of the motor in response to an electromotive force induced in at least one of the coils, wherein in the case that the motor is not driven, the controller maintains operations of the interrupter and outputs a presence signal by determining that an article is conveyed onto the conveyor unit upon detection of the rotation of the motor by means of the rotation detector, each controller being adapted to output the presence signal to controllers in a plurality of adjacent upstream zones, and simultaneously receive presence signals from controllers in a plurality of adjacent downstream zones.

The conveyor unit and the controller in the present aspect stably detects conveyance of an article onto the unit by means of a function of electric power generation of the motor without a sensor for detecting existence of an article, thereby achieving a cost saving and providing a conveyor unit readily designed.

Further, the conveyor unit and the controller in the present aspect stops a conveyed article to a predetermined position, thereby providing a conveyor unit readily designed.

Still further, there is provided with a conveyor unit capable of certainly detecting conveyance of any article onto any conveyor unit avoiding such a conveying status that conveyance of the article onto the conveyor unit is undetectable and stably controlling the conveyance.

Yet further, the present aspect provides a zone controlled conveyor system capable of controlling conveyance having linkage among control zones.

BRIEF DESCRIPTION OF THE DRAWINGS

FIG. 5 is a graph showing a switching signal generated by an interrupter of the controller, an electromotive force of an armature coil of the motor, and a rotational position sensing signal, with their time axes aligned;

FIG. 6 is a graph showing the switching signal and the electromotive force with their time axes enlarged and aligned;

FIG. 11 is a timing diagram showing operations of sections in the conveying states shown in FIGS. 10A to 10E;

FIG. 13 is a timing diagram showing operations of sections in the conveying states shown in FIGS. 12A to 12E;

FIG. 15 is a timing diagram showing operations of sections in the conveying states shown in FIGS. 14A to 14E;

DESCRIPTION OF THE PREFERRED EMBODIMENTS

Now, a preferred embodiment of the present invention will be described referring to the accompanying drawings.

Figure 1:
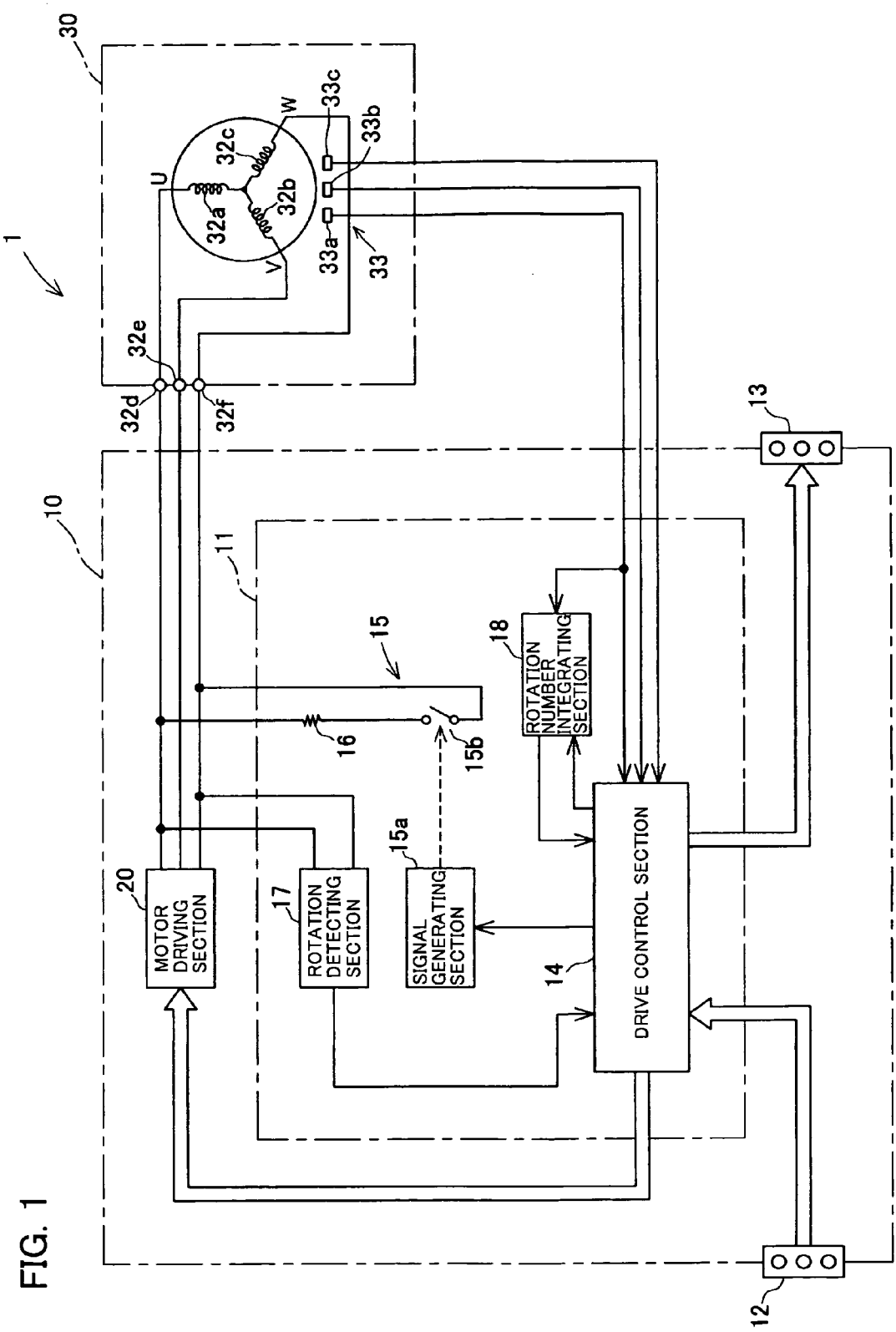
FIG. 1 is a block diagram of a controller and a motor incorporated in a conveyor unit embodying the present invention.

Referring to FIG. 1, a conveyor unit 2 in the preferred embodiment includes a motor 30 for powering a driving roller for conveying articles thereon and a controller 10 adapted to control operation of the motor 30.

The motor 30 employed in the embodiment has a stator 32 at its center and a rotor 31 at its outer periphery, which rotates.

Figure 2:
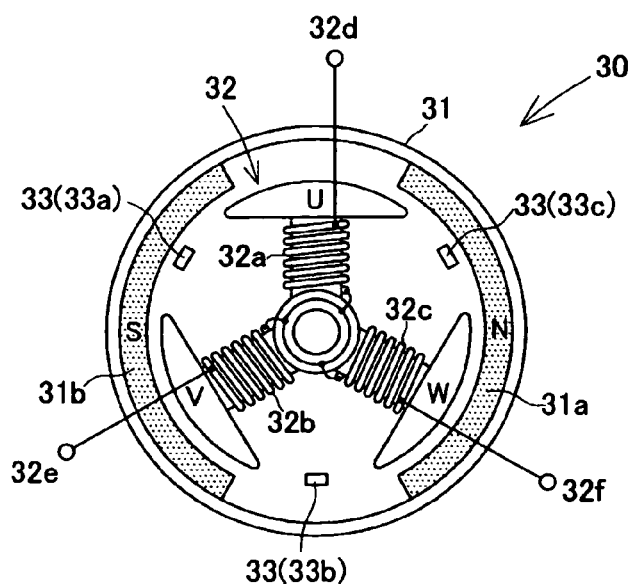
FIG. 2 is a schematic illustration showing an internal structure of the motor of the conveyor unit.

More specifically, as shown in FIG. 2, the motor 30 is a brushless motor having a structure with the stator 32 arranged at the central axis within the cylindrical rotor 31.

Figure 4:
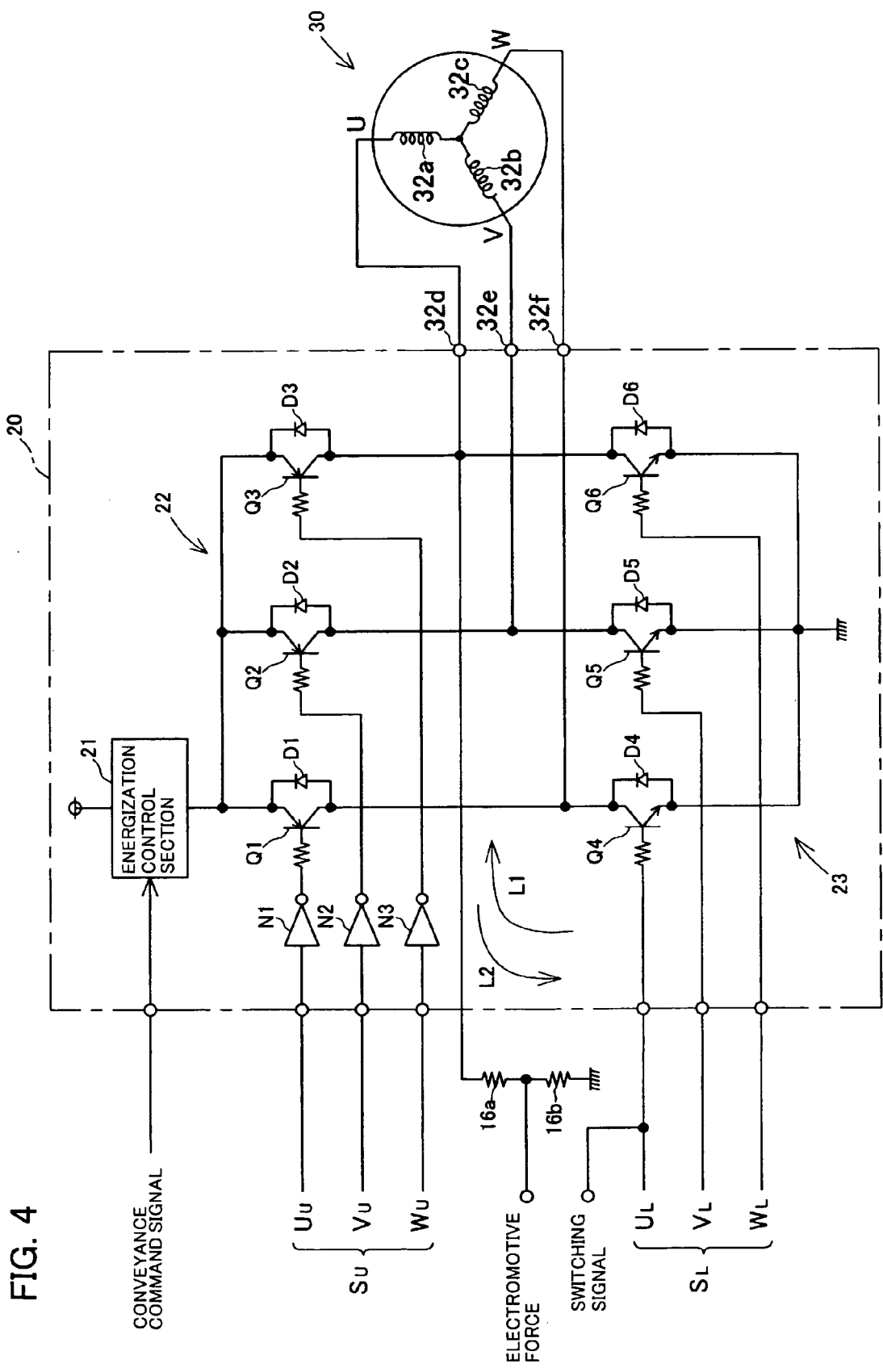
FIG. 4 is a detailed circuit diagram of a motor driving section of the controller and thereabout.

Herein, the motor 30 of the embodiment actually employs a three-phase brushless motor having four magnetic poles and six slots of the stator 32, but FIGS. 1, 2, and 4 illustrate the three-phase brushless motor having two magnetic poles and three slots as the motor 30 for simplicity.

Referring to FIG. 2, the rotor 31 has permanent magnets 31a and 31b secured to its inner surface with one type of magnetic pole facing to the other type of magnetic pole. Armature coils 32a, 32b, 32c are respectively wound around three slots (or phases) U, V, and W of the stator 32 in a same direction. Proximal ends adjacent to the center of the coils 32a, 32b, and 32c are mutually and electrically connected, whereas distal ends 32d, 32e, 32f are derived out of the motor 30. More specifically, the armature coils 32a, 32b, and 32c of three slots are connected in Y type at their proximal ends, and the distal ends 32d, 32e, and 32f thereof are derived out of the motor 30 to be connected to the controller 10.

The motor 30 accommodates three Hall elements 33a, 33b, and 33c for sensing a rotational position of the rotor 31. The Hall elements 33a, 33b, and 33c are secured at 120 degrees intervals around the central axis of the rotor 31, constituting a rotational position sensor 33. A rotational position sensing signal sensed at the rotational position sensor 33 is transmitted to the controller 10.

The controller 10 consists mainly of a controlling circuit 11, a motor driving section 20, and downstream and upstream connectors 12 and 13 for connecting with the conveyor units 2 located downstream and upstream respectively and has a function of control of the motor with reference to conveying statuses of adjacent conveyor units 2.

The controlling circuit 11 includes a drive control section 14, an interrupter 15, a rotation detecting section (rotation detector) 17, and a rotation number integrating section (rotation number integrator) 18.

The drive control section 14 supervises control in each section of the controlling circuit 11 by a digital control by means of CPU (central processing unit).

More specifically, the drive control section 14 has a control function generating driving signals for driving the motor 30 to output them to the motor driving section 20 and also control functions over each section of the interrupter 15, the rotation detecting section 17, and the rotation number integrating section 18. The drive control section 14 further has a function of sending and receiving signals with the other controllers 10 via the downstream and upstream connectors 12 and 13. These control functions are described in detail below.

The drive control section 14 generates driving signals so as to sequentially switch application of current to the armature coils U, V, and W of the brushless motor 30. More specifically, as shown in FIG. 3, the drive control section 14 sequentially generates six driving signals $U_U$, $V_U$, $W_U$, $U_L$, $V_L$, and $W_L$ being at H (high) level for only 120 degrees and at L (low) level for the rest of 240 degrees in response to a rotational position sensing signal outputted from the rotational position sensor 33, which signals are outputted to the motor driving section 20.

The signal $V_U$ has a lag of 120 degrees behind the signal $U_U$, whereas the signal $W_U$ has a lag of 120 degrees behind the signal $V_U$. The signal $U_L$ has a lag of 180 degrees behind the signal $U_U$. The signal $V_L$ has a lag of 120 degrees behind the signal $U_L$, whereas the signal $W_L$ has a lag of 120 degrees behind the signal $V_L$.

Therefore, neither of any pair selected from the driving signals $U_U$, $V_U$, and $W_U$ shows H level at the same time. Likewise, neither of any pair selected from the driving signals $U_L$, $V_L$, and $W_L$ shows H level at the same time. The motor driving section 20 effects the rotation control by sequentially switching application of current to the armature coils 32a, 32b and 32c of the corresponding U, V, and W phases in response to these driving signals generated in the drive control section 14.

Figure 3:
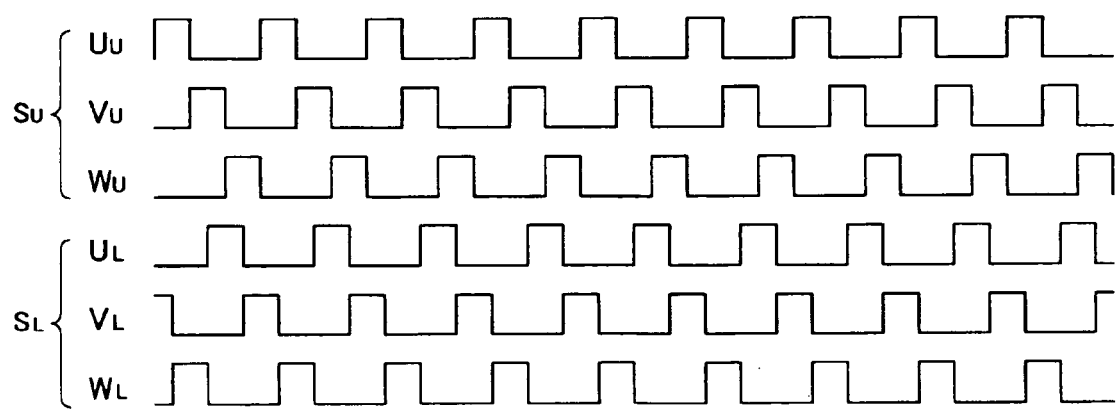
FIG. 3 is a timing diagram of driving signals for the motor.

Herein, each of the driving signals shown in FIG. 3 is generated with changing a frequency and maintaining the above-mentioned phase relationship in response to the sensing signal from the rotational position sensor 33; that is, the rotational speed of the rotor 31. A period of the driving signals varies depending on the rotational speed of the rotor 31.

Referring to FIG. 1, the interrupter 15 includes a signal generating section 15a for generating a switching signal and a switching device 15b that opens and closes upon receipt of the switching signal generated in the signal generating section 15a.

More specifically, the interrupter 15 has a function to generate a switching signal in the signal generating section 15a upon receipt of a command signal from the drive control section 14 to control opening and closing of the switching device 15b, whereby the distal ends 32d and 32f of the armature coils 32a and 32c of the motor 30 are repeatedly shunted and deshunted via a resistor 16.

The rotation detecting section 17, as shown in FIG. 1, has functions to monitor the electromotive force between the distal ends 32d and 32f of the coils 32a and 32c and to output a rotation detection signal to the drive control section 14 at the moment when the level of the electromotive force has exceeded a predetermined reference voltage.

More specifically, the rotation detecting section 17 monitors the electromotive force generated by the externally forced rotation of the rotor 31, so as to output the rotation detection signal to the drive control section 14 upon determination of the rotation of the rotor 31 at the moment when the electromotive force has exceeded a predetermined level.

In the present embodiment, the rotation detecting section 17 is constituted by a comparator using a calculating amplifier, whereby the electromotive force between the coils 32a and 32c is compared with a reference voltage.

The drive control section 14, as shown in FIG. 1, determines that an article is conveyed into an area powered by the motor, onto the conveyor unit, or into the home control zone when the rotation detection signal is transmitted to the section 14 from the rotation detecting section 17, so as to output a presence signal and also to transmit the presence signal to the upstream connector 13.

The drive control section 14 halts outputting the presence signal by determining that the article is conveyed out to the downstream when a presence signal is transmitted from the controller 10 located downstream via the downstream connector 12.

The rotation number integrating section 18, as shown in FIG. 1, has a function to count the rotational position sensing signals outputted from the Hall element 33a, one element of the rotational position sensor 33, upon receipt of a command signal of the drive control section 14, and to output a control signal to the drive control section 14 when the counted number has reached a predetermined number.

More specifically, the rotation number integrating section 18 outputs the control signal to the drive control section 14 when the integrated value of the rotation number of the rotor 31 has reached the predetermined value after having received the command signal from the drive control section 14.

Now, a circuit structure of the motor driving section 20 in the present embodiment is described in detail below.

Referring to FIG. 4, the motor driving section 20 includes an energization control section 21, an upper arm control section 22, and a lower arm control section 23.

The energization control section 21 allows application of a positive voltage from a power source circuit (not shown) during receiving a conveyance command signal transmitted from the drive control section 14 and shuts off application of the positive voltage during no conveyance command signal.

The upper arm control section 22 is constituted by circuits connecting the energization control section 21 (positive power source) to each of the ends 32f, 32e, and 32d of the armature coils 32c, 32b, and 32a via switching devices Q1, Q2, and Q3, respectively. The lower arm control section 23 is constituted by circuits connecting each of the ends 32f, 32e, and 32d to a ground potential (negative power source) via switching devices Q4, Q5, and Q6, respectively.

In the present embodiment, the switching devices Q1, Q2, and Q3 of the upper arm control section 22 each employ a PNP junction transistor, and the switching devices Q4, Q5, and Q6 of the lower arm control section 23 each employ an NPN junction transistor.

These transistors (switching devices) Q1 to Q6 respectively have protection diodes D1 to D6 each connected in antiparallel between a collector and an emitter.

Bases of the transistors Q1, Q2, and Q3 of the upper arm control section 22 are connected to the drive control section 14 via inverting circuits N1, N2, and N3 respectively. Bases of the transistors Q4, Q5, and Q6 of the lower arm control section 23 are connected to the drive control section 14.

The motor driving section 20 in this structure receives the positive voltage applied from the energization control section 21 while the conveyance command signal is transmitted from the drive control section 14, whereas the drive control section 14 generates the driving signals (see FIG. 3) with reference to the rotational position sensing signal transmitted from the rotational position sensor 33 to transmit the driving signals to the motor driving section 20. Consequently, driving signals $S_U$ ($U_U$, $V_U$, $W_U$, see FIG. 3) are inverted at the inverting circuits N1, N2, and N3 to be sequentially applied to the transistor Q1, Q2, and Q3 of the upper arm control section 22 respectively, and driving signals $S_L$ ($U_L$, $V_L$, and $W_L$, see FIG. 3) are sequentially applied to the transistor Q4, Q5, and Q6 of the lower arm control section 23 respectively, with the consequence that sequentially switching application of current to the armature coils 32a, 32b and 32c of the corresponding U, V, and W phases of the brushless motor 30 drives the rotation of the motor 30.

The drive control section 14 further outputs a driving status signal indicating that the motor 30 is in operation to the upstream connector 13 while transmitting the conveyance command signal to the motor driving section 20 to drive the motor 30.

In order to halt the driving of the motor 30, the drive control section 14 i 5 halts outputting the conveyance command signal to shut off application of the positive voltage from the energization control section 21 and also outputting the driving signals. Further, the drive control section 14 applies braking signals to all the transistors Q1 to Q6 to render them conductive. Closed circuits constituted by the conductive transistors Q1 to Q6 and the protection diodes D1 to D6 put dynamic braking by shunting the ends of the armature coils 32a, 32b, and 32c of the motor 30, thereby making a halt of the rotation of the motor 30 in a short period of time.

The present embodiment uses the switching device (transistor Q4) of the motor driving section 20 also as the switching device 15b of the interrupter 15 shown in FIG. 1. Thus, modified structures in switching by the interrupter 15 and in detection by the rotation detecting section 17 shown in FIG. 1 are employed.

More specifically, its circuit structure is formed such that the switching signal generated at the signal generating section 15a of the interrupter 15 is applied to the base of the transistor Q4 provided at the lower arm control section 23 of the motor driving section 20, and that the end 32d of the armature coil 32a is earthed via resistors 16a and 16b.

Further, the circuit structure is formed such that a terminal voltage of the resistor 16b is inputted to the rotation detecting section 17 as a detection signal of the electromotive force.

Now, an operation of detecting the externally forced rotation of the motor by the controller 10 having the above-mentioned structure is described below.

The externally forced rotation of the motor 30 is detected while the motor 30 is not in driving; more specifically while the conveyance command signal is not transmitted from the drive control section 14 to the motor driving section 20 and while the positive voltage application by the energization control section 20 of the motor driving section 20 is shut off.

During non-drive of the motor 30, a holding state continues, wherein the switching signal generated in the signal generating section 15a (see FIG. 1) of the interrupter 15 is applied to the transistor Q4 of the lower arm control section 23 of the motor driving section 20.

In the holding state, the externally forced rotation of the rotor 31 induces electromotive force according to the rotational speed in the armature coils 32a, 32b, and 32c. Once the transistor Q4 is rendered conductive by the switching signal, the electromotive force induced in the coils 32a and 32c applies current in a closed circuit L1 including the coil 32c, the transistor Q4, the resistor 16b, the resistor 16a, and the coil 32a.

In the present embodiment, as shown in FIG. 6, the switching signal generated in the signal generating section 15a consists of a plurality of pairs of pulse signals (a plurality of pulse trains), each of the pairs consisting of two pulse signals for a duration of substantially 45 μS and with substantially 1.3 mS interval, the pairs repeated at substantially 190 Hz (with 5.3 mS intervals).

In other words, the present embodiment employs such a structure that it shunts the armature coils 32a and 32c by repeating pulse trains of shunting with a predetermined cycle (e.g., with 5.3 mS intervals), each of the pulse trains comprising a plurality of pulses (e.g., two pulses) of shunting generated at predetermined intervals or interval (e.g., with 1.3 mS interval).

As described above, the shunting is preferably performed for the shortest possible duration and with longest possible cycle. From this point of view, the shunting is preferably performed for duration of 100 μS or less; more preferably of less than 50 μS as in the embodiment.

Further, the shunting is preferably performed with a cycle of 1.0 mS or more; more preferably of about 1.3 mS as in the embodiment.

Still further, the shunting is preferably performed with the total time of shunting less than 50 msec/sec; that is, less than 5 per cent of the overall time.

The current flown in the closed circuit L1 including the armature coils 32a and 32c while the transistor Q4 is rendered conductive by a pulse signal being on for an extremely short period of time is shut off according to a halt of the pulse signal to generate a back electromotive force in the armature coils 32a and 32c.

The generated back electromotive force produces current flowing in the closed circuit L1 from the armature coil 32a to the armature coil 32c through the resistor 16a, the resistor 16b, and the protection diode D4, and as shown in FIGS. 5 and 6, generates a large back electromotive voltage at the both ends of the resistor 16b.

The back electromotive voltage is outputted to the rotation detecting section 17 to detect the externally forced rotation of the rotor 31.

Figure 17:
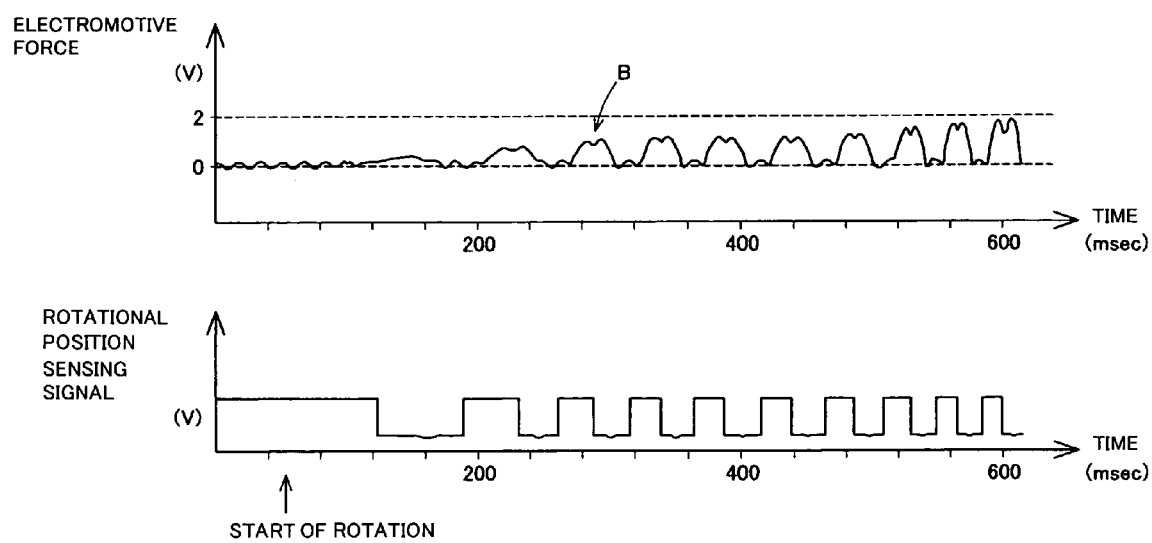
FIG. 17 is a graph showing the rotational position sensing signal and the electromotive force in the conveyor unit 100 shown in FIG. 16 with their time axes aligned, the detection signal being outputted from the Hall elements 104 in an externally forced rotation of the rotor (not shown) of the motor 103, the electromotive force being generated in the armatures.

In the structure of the embodiment, as shown in FIG. 5, the electromotive force beyond the voltage (substantially 2V) outputted by the structure shown in FIG. 17 has been already obtained adjacent to the first pulse of the rotational position sensing signal; that is, at the moment when the rotor 31 has made the first externally forced rotation (the point A in FIG. 5).

The electromotive force beyond substantially 7V has been obtained adjacent to the second pulse of the sensing signal; that is, at the moment when the rotor 31 has made the second rotation (the point B in FIG. 5).

The electromotive force shown in FIG. 5 indicates the voltage level at the both ends of the resistor 16b shown in FIG. 4.

Herein, the driving roller employed in the present embodiment is a motorized roller incorporating the brushless motor 30 having an outer diameter of the roller of 48.6 mm, a reduction gear ratio of 1/12.64. Consequently, the driving roller has a peripheral speed of substantially 5 m/min at the point B in FIG. 5; that is, at the point when the electromotive force of substantially 7V is obtained.

On the contrary, in the structure shown in FIG. 17, the electromotive force obtained at the point B of an externally forced rotation of the driving roller at the peripheral speed of 5 m/min is merely about 1V. That suggests that the structure of the present embodiment obtains a significantly higher electromotive force than the above-mentioned structure shown in FIG. 17.

As just described, the structure in the present embodiment obtains a sufficient electromotive force in comparison to the noise components at the moment when an externally forced rotation of the driving roller is at the peripheral speed of 5 m/min. Thereby, a detecting threshold value having a sufficient margin against the noise can be set at the rotation detecting section 17 with easy designing and further achieving of detection of the rotation of the motor 30 (driving roller) in a short period of time.

Next, a structure and conveying operations of a zone controlled conveyor system 1 incorporating the conveyor unit 2 of the present embodiment is described in detail below, making reference to FIGS. 7 to 15.

Figure 7:
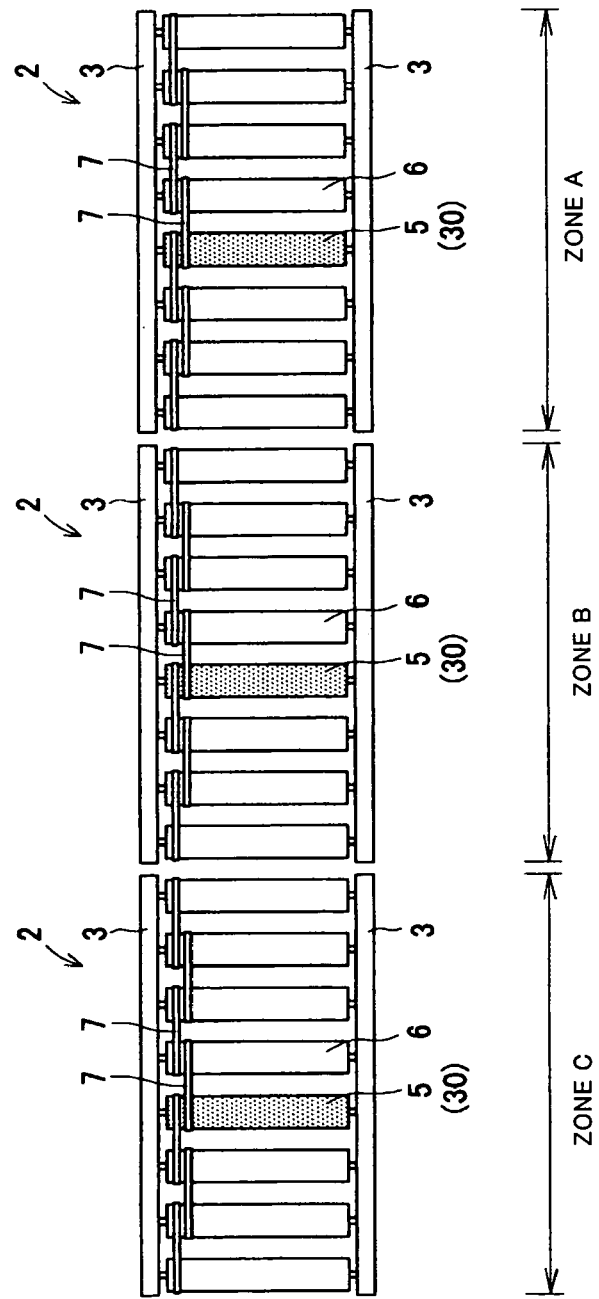
FIG. 7 is a plan view of a zone controlled conveyor system embodying the present embodiment.

The zone controlled conveyor system 1 in the present embodiment, as shown in FIG. 7, is divided into a plurality of control zones (zones for control) including control zones A, B, and C, each of which having one conveyor unit 2. The conveyor units 2 each have the same structure if not otherwise specified.

The conveyor unit 2 is constituted by one driving roller 5 and a plurality of free rollers 6 supported rotatably each through a shaft between a pair of side frames 3 and 3 positioned parallel on each side. The driving roller 5 and the free rollers 6 are arranged in a row in a direction of conveyance at predetermined equal intervals. The driving roller 5 is a motorized roller incorporating the motor 30 for driving the roller 5, and the free rollers 6 are rollers that can freely rotate.

Driving belts 7 are spanned each other between the adjacent driving roller 5 and free roller 6 and between the adjacent free rollers 6 to mutually connect them, so that a rotation driving of the driving roller 5 transmits a driving force for rotation to all the free rollers 6 to rotate and that an externally forced rotation of any of the free rollers 6 in non-driving of the driving roller 5 transmits its torque to the driving roller 5 to rotate.

In the present embodiment, one driving roller 5 is positioned at the substantially central part of each unit 2, the other rollers being the free rollers 6.

Figure 8:
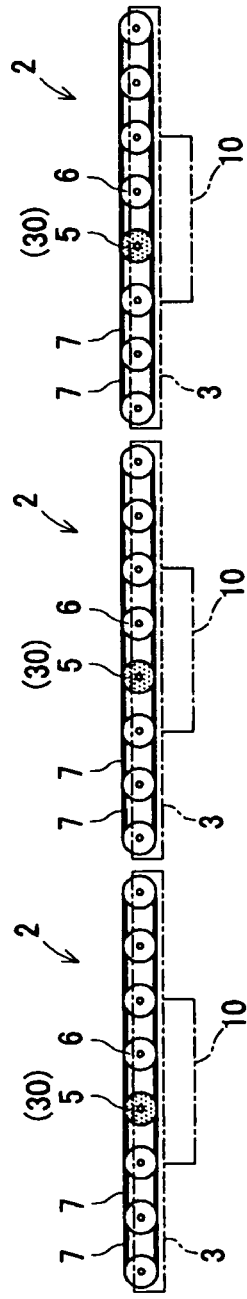
FIG. 8 is a side view of the zone controlled conveyor system shown in FIG. 7.

Referring to FIG. 8, each conveyor unit 2 has the controller 10 for controlling operation of the motor 30 incorporated in the driving roller 5 secured beneath its central part.

Figure 9:
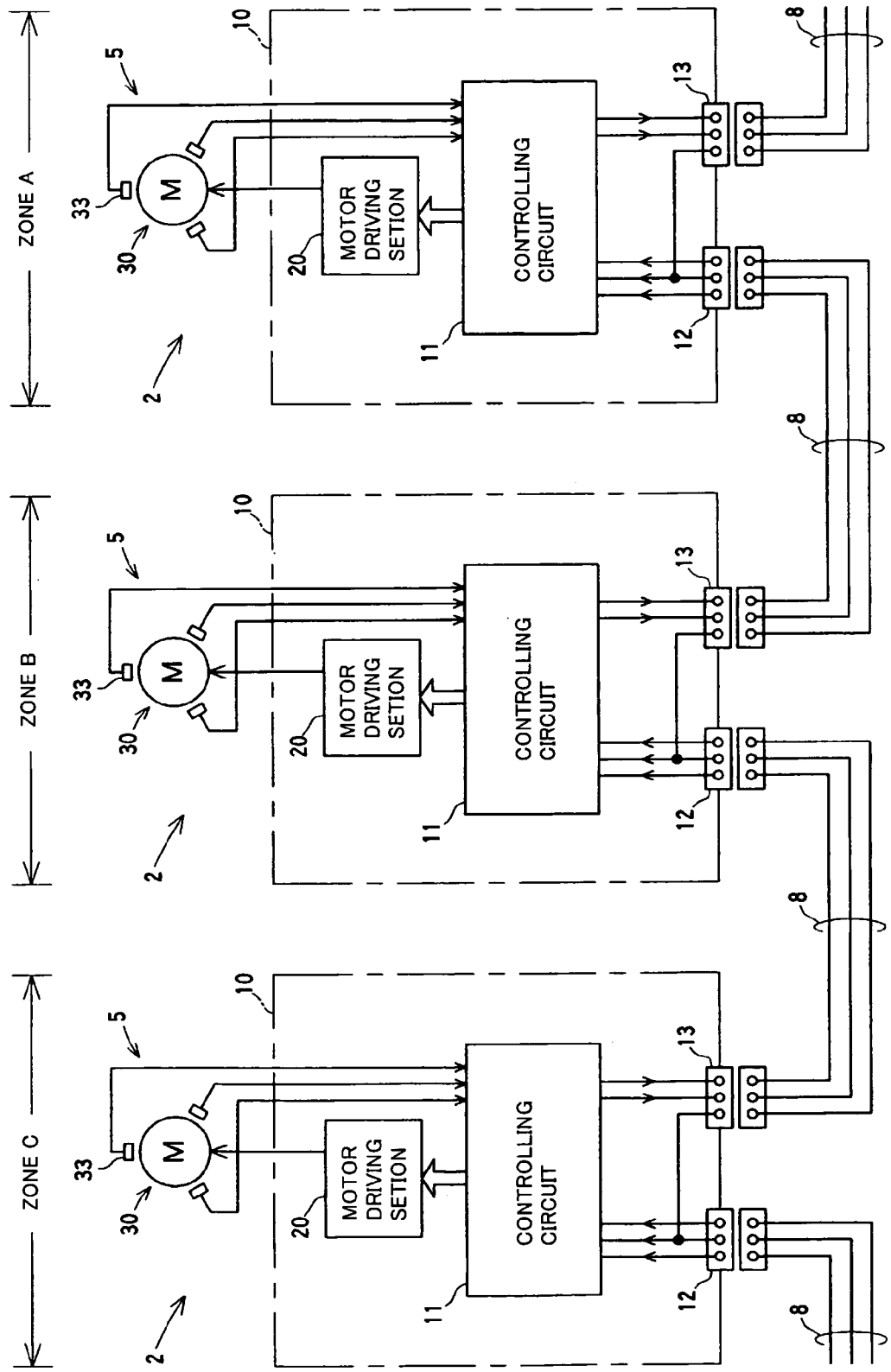
FIG. 9 is a connection diagram of the conveyor units in the conveyor system shown in FIG. 7.

Referring to FIG. 9, adjacent conveyor units 2 are sequentially connected by connecting cables 8 between the downstream connector 12 of the controller 10 and the upstream connector 13 of the controller adjacent to its downstream.

Now, signals to which the controller 10 refers in the conveyor system 1 in the present embodiment are described below. In the following description, the control zone A is referred to as a home zone, the control zone B as a next zone, and the control zone C as a zone after next.

The controller 10 in the home zone refers to five signals listed below:

(1) a presence signal of the home zone (outputted from the drive control section 14);

(2) a driving status signal of the home zone (outputted from the drive control section 14);

(3) a presence signal of the next zone (received via the downstream connector 12);

(4) a driving status signal of the next zone (received via the downstream connector 12); and (5) a driving status signal of the zone after next (received via the downstream connector 12).

As described above, the conveyor unit 2 of the present embodiment is designed to determine whether any article is conveyed thereonto by detecting the externally forced rotation of the motor 30 only in non-driving of the motor 30 by the controller 10.

Consequently, the controller 10 is designed to perform a conveying control with separating articles according to conveying conditions described below with reference to the signals so as to prevent the articles from conveying thereonto during driving of the motor 30.

(1) the condition under which an article in the home zone can be conveyed to the next zone: when the next zone and the zone after next are not in driving and no article exists on the next zone.

(2) the conditions under which an article in the home zone can not be conveyed to the next zone:

1. when an article exists on the next zone;
2. when the next zone is in driving;
3. when the next zone is conveying an article to the zone after next.

More specifically, whether the zone is in driving or not or whether an article exists or not is determined with reference to existences of the driving status signals or the presence signals transmitted via the downstream connector 12.

Further, whether an article is conveyed from the next zone to the zone after next is determined with reference to situations of outputting of the driving status signal from the next zone and of stopping the output of the presence signal of the next zone.

Now, an example of conveyance by the zone controlled conveyor system 1 of the present embodiment performed according to the above-mentioned conveying conditions is described in detail below, making reference to FIGS. 1 and 7 to 15.

Figure 10A:
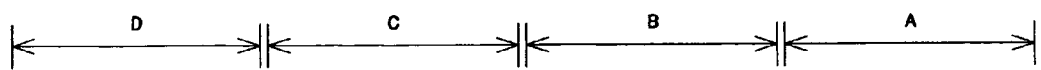
FIGS. 10A to 10E are diagrams illustrating conveying states performed in the conveyor system shown in FIG. 7.

FIG. 10A illustrates a situation in which a work W exists on only the control zone A and not in any control zones B to D and the motor 30 is not in driving.

This situation satisfies the condition under which an article can be conveyed from the control zone A to the next zone. The controller 10 in the zone A determines to be ready for conveyance by means of the drive control section 14 and drives the driving roller 5 to convey the work W toward its downstream.

Figure 10B:

When the work W is conveyed downstream to reach the control zone B, as shown in FIG. 10B, the free roller 6 at the upstream end of the zone B is rotated by the work W, whereupon the driving roller 5 in the zone B is rotated accordingly, so as to generate a large back electromotive force in the armature coils 32a and 32c.

Thereby, referring to FIG. 11, the rotation detecting section 17 in the zone B detects conveyance of the work W thereonto accompanied by the rotation of the motor 30 in the zone B, thereby outputting a rotation detection signal to the drive control section 14 in the zone B.

The drive control section 14 outputs a presence signal upon receipt of the rotation detection signal transmitted from the rotation detecting section 17 and sends a control signal to the rotation number integrating section 18 in the zone B to start integrating the rotation number of the motor 30.

When the drive control section 14 in the zone B outputs a presence signal, the zone A stops driving of the motor 30 and stops outputting the driving status signal and the presence signal, as shown in FIG. 11.

Figure 10C:

Thereby, as shown in FIG. 10C, the work W whose conveyance onto the zone B is detected moves slightly downstream and stops following stopping of conveying operation on the zone A. According to stopping of the work W, the rotation detecting section 17 in the zone B stops outputting the rotation detection signal.

Figure 10D:
Figure 10E:
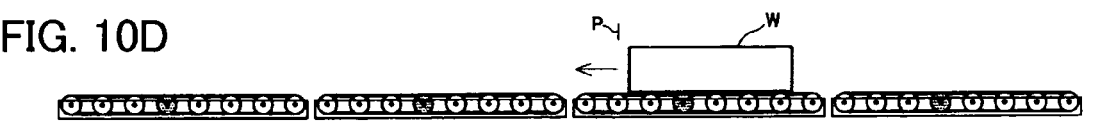

If the rotation detection signal from the rotation detecting section 17 stops, the drive control section 14 generates a driving signal to start a rotation driving of the motor 30 immediately. Thereby, the work W is conveyed toward downstream in the zone B. When the integrated value of the rotation number integrating section 18 has reached a predetermined value, as shown in FIG. 10D, the work W is situated slightly upstream of a predetermined position P on the zone B.

When the integrated value has reached the predetermined value, the drive control section 14 refers to a presence signal transmitted from the control zone C and driving status signals transmitted from the control zones C and D. As the reference shows that the work W does not exist on the zone C and that both the zones C and D are not in driving, the drive control section 14 determines to be ready for conveyance towards downstream and resets the integrated value of the rotation number integrating section 18. Then, in the same manner as the conveyance shown in FIGS. 10A to 10D, the work W is continued to be conveyed from the zone B to the zone C.

In this way, when the conditions of conveyance toward downstream are satisfied at the controller 10 in the home zone, the conveyor system 1 in the embodiment makes a control of continuous conveyance of the work W toward downstream.

Figure 12A:
FIGS. 12A to 12E are diagrams illustrating other conveying states performed in the conveyor system shown in FIG. 7.
Figure 12B:
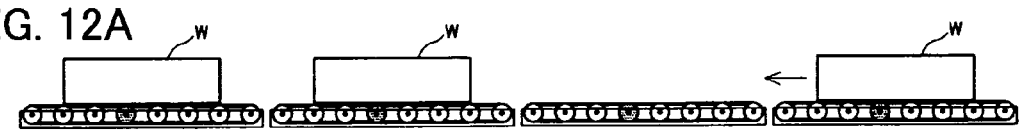
Figure 12C:
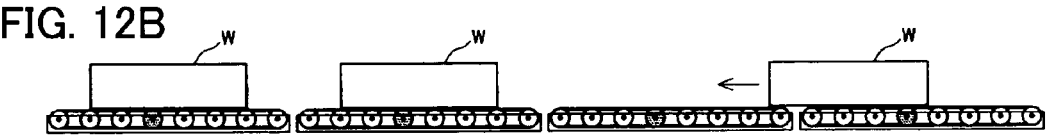
Figure 12D:
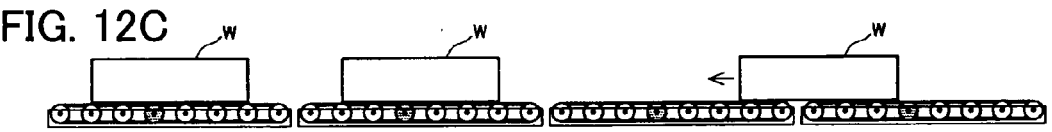
Figure 12E:
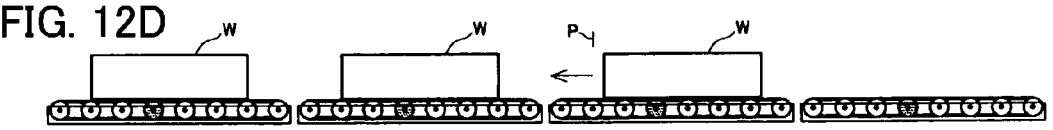

As shown in FIG. 12A, a situation in which works Ws exist on the zones A, C, and D, in which the zones B to D are not in driving, and in which no work W exists on the zone B satisfies the condition to convey the work W to the next zone from the zone A. Thus, the drive control section 14 in the zone A determines to be ready for conveyance and drives the driving roller 5 to convey the work W toward downstream.

Then, in the same manner as the operation shown in FIGS. 10A to 10D, the work W is conveyed in the zone B, as shown in FIGS. 12A to 12D.

When the integrated value of the rotation number 18 has reached a predetermined value during conveyance of the work W within the zone B, the drive control section 14 refers to a presence signal transmitted from the zone C and driving status signals transmitted from the zones C and D. As the reference shows that the work W exists on the zone C, the drive control section 14 determines that conveyance toward downstream is forbidden to stop driving of the motor 30, to reset the integrated value, and to stop outputting the driving status signal. Thereby, the work W stops at the predetermined position P on the zone B.

In this way, when works Ws rest in the downstream zones, the conveyor system 1 in the embodiment makes a control of sequential conveyance of the work W into the immediately adjacent upstream zone of the downstream zones with no interval and of stopping the work W.

Figure 14A:
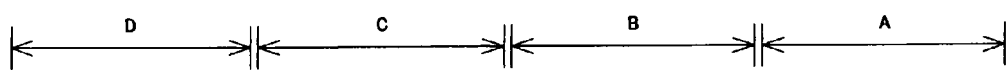
FIGS. 14A to 14E are diagrams illustrating still other conveying states performed in the conveyor system shown in FIG. 7.

As shown in FIG. 14A, a situation in which works W1 and W2 simultaneously exist in the zones A and B respectively satisfies the condition of conveyance to the next zone from the zones B and C. Thus, in the same manner as the control shown in FIGS. 10A to 10E, the work W2 is conveyed toward downstream, as shown in FIGS. 14A to 14E.

Figure 14B:
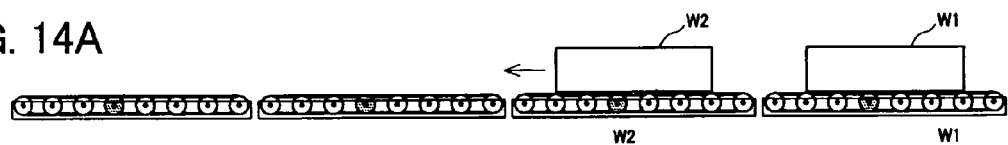
Figure 14C:
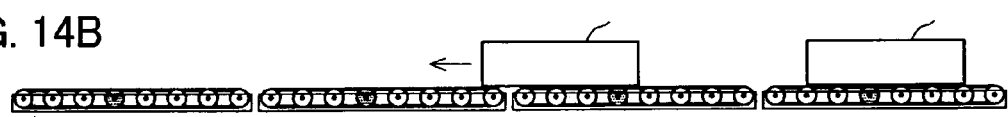

However, in the zone A, conveyance to the next zone is forbidden during a period shown in FIGS. 14A to 14C; that is, until the zone C stops driving. More specifically, as shown in FIG. 14D, conveyance of the work W1 toward downstream is forbidden until the zone C stops outputting the driving status signal upon detection of conveyance of the work W2 into the zone D (see FIG. 15).

Figure 14D:
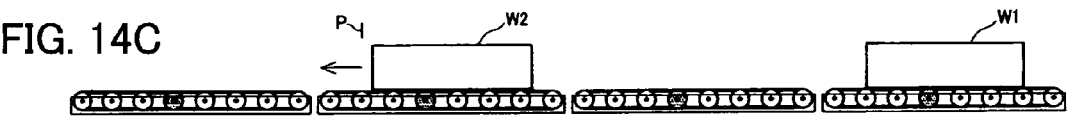
Figure 14E:
Figure 16:
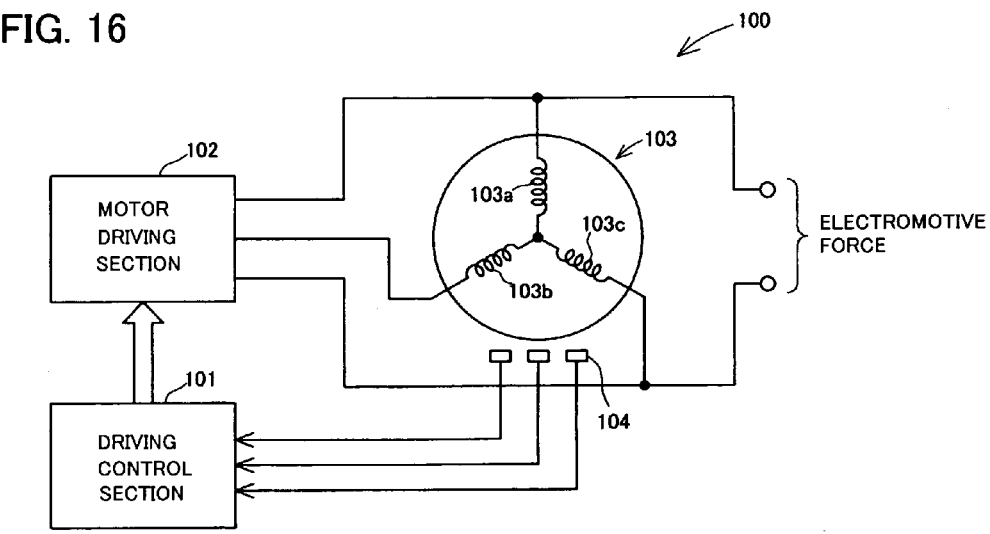
FIG. 16 is a block diagram showing an operating principle of a conveyor unit 100 experimentally created by the inventors.

The zone C stops outputting the driving signal upon detection of the work W2 conveyed into the zone D, whereupon the zone A starts conveyance of the work W1 toward downstream as shown in FIG. 14D. At this stage, the zone D continues to convey the work W2 toward downstream (see FIG. 15).

Then, the conveyor system 1 controls conveyance of the work W1, which has started to be conveyed, toward downstream in each of the downstream zones B, C, . . . , with being separated from the work W2 according to the conveying conditions.

In this way, the conveyor system 1 of the present embodiment efficiently conveys articles toward downstream with separating each of the works Ws so as to avoid detection of conveyance of the article onto each conveyor unit 2 during conveyance by employing the conveying conditions described above. Further, the conveyor system 1 stops the works Ws in the zone where the works Ws should rest by conveying them with no intervals behind the upstream zones.

According to the embodiment, the zone controlled conveyor system 1 that dispenses with a sensor for detecting existence of a work W and that is constructed readily with cost saving is provided.

These are on the conveyor unit 2 and the zone controlled conveyor system 1 incorporating the conveyor unit 2 relating to the preferred embodiment of the present invention, but the invention is not limited thereto.

The conveyor unit 2 shown in the embodiment, for example switches on/off the transistor Q4 positioned at the lower arm control section 23 of the motor driving section 20 by means of the signal generating section 15a of the interrupter 15, but can switch on/off the transistor Q5 or Q6. Any of the transistors Q1 to Q3 positioned at the upper arm control section 22 can be also switched on/off by changing connection of the resistor 16b with the ground to with the positive power source, so as to generate a back electromotive force.

Further, the motor driving section 20 can employ a switching device such as a MOSFET or a switching module having devices such as a plurality of transistors or MOS-FETs integrally packaged instead of a transistor.

The conveyor unit 2 in the embodiment can employ a structure capable of further referring to a presence signal from the zone after next by the controller 10, so as to add another conveying condition under which articles can be conveyed toward downstream when no article exists in the next zone that is not in driving and when an article is under conveyance out of the zone after next. Whether an article is under conveyance out of the zone after next is determined by detecting that the presence signal from the zone after next is off and that the driving signal therefrom is on.

This structure starts to convey an article toward downstream at the earlier point than that of the above-mentioned embodiment, thereby improving an efficiency of conveyance.

The conveyor unit 2 of the embodiment does not mention of a structure of process for determination of conveying conditions at the drive control section 14, but can employ a structure determining by means of a program manipulation based on presence signals or driving status signals from the home zone, the next zone, and the zone after next, or by means of a logical circuit using a logic IC.

The conveyor unit 2 of the embodiment is designed to convey articles conveyed thereonto to a predetermined position by providing the rotation number integrating section 18 in the controller 10, but can have a timer instead of the section 18 so that the conveyor unit 2 conveys an article to a predetermined position on the conveyor unit by driving the motor 30 until the timer measures a predetermined time duration from the point of the first detection of the rotation of the motor by the rotation detecting section 17.

The present embodiment dispenses with a mode-setting section adapted to forbid conveyance toward downstream, but in FIG. 1, for example, it can employ a structure capable of setting a conveyance-forbidding mode, in which conveyance toward downstream is forbidden regardless of existence of an article, which is embodied by providing a mode-setting switch capable of holding an input line of presence signals and driving status signals of the downstream connector in the on level.

The conveyor units 2 of the present invention can each be provided with a connecting terminal allowing for connection with a supervisory controller, so as to construct a zone controlled conveyor system in which operations of the conveyor units 2 are controlled centrally by the supervisory controller.

The invention claimed is:

1. A conveyor unit comprising:
 a driving roller that is operable to convey articles;
 a motor for powering the driving roller; and
 a controller adapted to adjust the motor so as to control the driving roller to thereby control conveyance of articles based upon forces induced to the motor in response to different detected states of article conveyance,
 the motor comprising a permanent magnet and an armature having a plurality of armature coils; and
 the controller having an interrupter adapted to repeat shunting and deshunting of at least one of the coils.

2. The conveyor unit as defined in claim 1,
 being adapted to detect an externally forced rotation of the motor in response to an electromotive force induced in at least one of the coils.

3. The conveyor unit as defined in claim 1,
 being adapted to perform the shunting in a condition that the armature is not energized.

4. The conveyor unit as defined in claim 1,
 being adapted to perform the shunting in a condition that the armature is halted.

5. The conveyor unit as defined in claim 1,
 being adapted to perform the shunting via a resistor.

6. The conveyor unit as defined in claim 1,
 being adapted to perform the shunting repeatedly, each shunting for a duration of 100 µS or less.

7. The conveyor unit as defined in claim 1,
 being adapted to perform the shunting periodically with a cycle of 1.0 mS or more.

8. The conveyor unit as defined in claim 1,
 being adapted to perform the shunting repeatedly with the total time of shunting less than 5 per cent of the overall time.

9. The conveyor unit as defined in claim 1,
 being adapted to perform the shunting by repeating pulse trains of shunting with a predetermined cycle, each of the pulse trains comprising a plurality of pulses of shunting generated at predetermined intervals.

10. The conveyor unit as defined in claim 1,
 the controller further having a rotation detector adapted to detect an externally forced rotation of the motor in response to an electromotive force induced in at least one of the coils,
 wherein in the case that the motor is not driven, the controller maintains operations of the interrupter and outputs a presence signal by determining conveyance of an article into an area powered by the motor upon detection of the rotation of the motor by means of the rotation detector.

11. The conveyor unit as defined in claim 10,
 the controller being adapted to receive external presence signals transmitted from outside, so as to stop outputting its presence signal upon receipt of an external presence signal during outputting its presence signal.

12. The conveyor unit as defined in claim 1,
 wherein the interrupter comprises a signal generating section adapted to generate switching signals and a switching device adapted to perform the shunting and deshunting in accordance with the switching signals.

13. The conveyor unit as defined in claim 12,
 wherein the motor is a brushless motor having a rotor and a rotational position sensor adapted to determine a rotational position of the rotor,
 the controller further having a drive control section and a motor driving section,
 the drive control section being adapted to generate a driving signal in response to a sensing signal transmitted by the rotational position sensor,
 the motor driving section incorporating a plurality of switching devices and adapted to control energization of each of the coils by adjusting opening and closing of the switching devices in response to the driving signal,
 at least one of the switching devices in the motor driving section being adapted to function also as the switching device in the interrupter.

14. The conveyor unit as defined in claim 1,
 the controller further having a rotation detector adapted to detect an externally forced rotation of the motor in response to an electromotive force induced in at least one of the coils and a rotation number integrating section adapted to integrate the rotation number of the driving roller or of the motor powering the driving roller,
 so that the conveyor unit conveys an article to a predetermined position on the conveyor unit by driving the motor until the rotation number reaches a predetermined value, the number being integrated from the point of the first detection of the rotation of the motor by means of the rotation detector.

15. The conveyor unit as defined in claim 1,
the controller further having a rotation detector and a timer, the rotation detector being adapted to detect an externally forced rotation of the motor in response to an electromotive force induced in at least one of the coils,
so that the conveyor unit conveys an article to a predetermined position on the conveyor unit by driving the motor until the timer measures a predetermined time duration from the point of the first detection of the rotation of the motor by means of the rotation detector.

16. The conveyor unit as defined in claim 1,
the controller further having a driving status signal generator adapted to output a driving status signal indicating the motor in driving and a rotation detector adapted to detect an externally forced rotation of the motor in response to an electromotive force induced in at least one of the coils,
so that the controller transmits a presence signal by determining conveyance of an article into an area powered by the motor upon detection of the rotation of the motor by means of the rotation detector and receives a plurality of driving status signals and at least one presence signal transmitted from outside.

17. A zone controlled conveyor system comprising a plurality of zones for control arranged in a row in the direction of conveyance of articles, each of the zones having the conveyor unit as defined in claim 1.

18. The zone controlled conveyor system as defined in claim 17, comprising a plurality of zones for control arranged in a row in the direction of conveyance of articles, each of the zones having the conveyor unit as defined in claim 16,
each controller being adapted to output at least one signal selected from a driving status signal and a presence signal to the controllers in a plurality of adjacent upstream zones, and simultaneously receive at least one signal selected from driving status signals and presence signals from controllers in a plurality of adjacent downstream zones.

19. A controller for controlling a driving roller for use in a conveyor unit having a motor for powering the driving roller,
the motor comprising a permanent magnet and an armature having a plurality of armature coils,
wherein the controller has an interrupter being adapted to repeat shunting and deshunting of at least one of the coils.

20. The controller as defined in claim 19,
being adapted to detect an externally forced rotation of the motor in response to an electromotive force induced in at least one of the coils.

21. The controller as defined in claim 19,
being adapted to perform the shunting in a condition that the armature is halted.

22. The controller as defined in claim 19,
being adapted to perform the shunting via a resistor.

23. The controller as defined in claim 19,
being adapted to perform the shunting repeatedly, each shunting for duration of 100 µS or less.

24. The controller as defined in claim 19,
wherein in the case that the motor is not driven, the controller maintains operations of the interrupter and outputs a presence signal by determining conveyance of an article into an area powered by the motor upon detection of the rotation of the motor by means of the rotation detector.

25. A zone controlled conveyor system comprising a plurality of zones for control arranged in a row in the direction of conveyance of articles, each of the zones having a conveyor unit,
the conveyor unit in each of the zones comprising a driving roller for conveying an article, a motor for powering the driving roller, and a controller adapted to adjust the motor so as to control the driving roller,
the motor comprising a permanent magnet and an armature having a plurality of armature coils,
the controller having an interrupter adapted to repeat shunting and deshunting of at least one of the coils,
the controller further having a rotation detector adapted to detect an externally forced rotation of the motor in response to an electromotive force induced in at least one of the coils,
wherein in the case that the motor is not driven, the controller maintains operations of the interrupter and outputs a presence signal by determining that an article is conveyed onto the conveyor unit upon detection of the rotation of the motor by means of the rotation detector,
each controller being adapted to output the presence signal to controllers in a plurality of adjacent upstream zones, and simultaneously receive presence signals from controllers in a plurality of adjacent downstream zones.

* * * * *